United States Patent
Liu et al.

(10) Patent No.: US 8,594,515 B2
(45) Date of Patent: Nov. 26, 2013

(54) DIGITAL PHASE CONJUGATION FOR FIBER-OPTIC LINKS

(75) Inventors: Xiang Liu, Marlboro, NJ (US); Chandrasekhar Sethumadhavan, Matawan, NJ (US); Robert W. Tkach, Little Silver, NJ (US)

(73) Assignee: Alcatel Lucent, Paris (FR)

( * ) Notice: Subject to any disclaimer, the term of this patent is extended or adjusted under 35 U.S.C. 154(b) by 207 days.

(21) Appl. No.: 13/039,580

(22) Filed: Mar. 3, 2011

(65) Prior Publication Data

US 2012/0224855 A1 Sep. 6, 2012

(51) Int. Cl.
*H04B 10/06* (2011.01)

(52) U.S. Cl.
USPC ............. 398/208; 398/202; 398/147; 398/81; 398/175; 398/193; 398/194; 398/158; 398/159; 398/183; 398/188

(58) Field of Classification Search
USPC ............. 398/147, 150, 158, 159, 81, 79, 202, 398/173, 175, 176, 204, 205, 206, 207, 208, 398/209, 183, 188, 212, 213, 214, 161, 65, 398/152, 193, 194, 192
See application file for complete search history.

(56) References Cited

U.S. PATENT DOCUMENTS

| | | | |
|---|---|---|---|
| 7,450,863 B2 | 11/2008 | Winzer | |
| 2002/0114040 A1* | 8/2002 | Watanabe | 359/161 |
| 2007/0036555 A1* | 2/2007 | Chen et al. | 398/188 |
| 2007/0134001 A1 | 6/2007 | Kim et al. | |
| 2008/0138070 A1 | 6/2008 | Yan et al. | |
| 2010/0158521 A1 | 6/2010 | Doerr et al. | |
| 2011/0038631 A1 | 2/2011 | Doerr | |
| 2012/0177386 A1* | 7/2012 | Zhou et al. | 398/208 |

OTHER PUBLICATIONS

Yariv, Amnon et al., "Compensation for Channel Dispersion by Non-linear Optical Phase Conjugation," Optics Letters, vol. 4, No. 2, Feb. 1979, 99.52-54.
Fisher, Robert A. et al., "Optical Phase Conjugation for Time-Domain Undoing of Dispersive Self-Phase-Modulation Effects," Optics Letters, vol. 8, No. 12, Dec. 1983, pp. 611-613.
Chowdhury, A., "Compensation of Intra-channel Nonlinearities in 40 Gb/s Pseudo-Linear Systems Using Optical Phase Conjugation," Optical Fiber Communication Conference, Feb. 2004, vol. 2, (3 pages).

(Continued)

*Primary Examiner* — Hanh Phan
(74) *Attorney, Agent, or Firm* — Mendelsohn, Drucker & Dunleavy, P.C.; Yuri Gruzdkov; Steve Mendelsohn

(57) ABSTRACT

An optical phase conjugator that can be deployed within a long-haul fiber-optic link of an optical WDM system to improve the system's tolerance to intra- and inter-channel nonlinear effects. In one embodiment, the optical phase conjugator has a digital signal processor configured to perform, in the digital electrical domain, a phase-conjugation transformation for various components of a WDM signal so that certain signal distortions imposed on that signal in the front portion of the fiber-optic link are reduced in the back portion of the link. Advantageously, the optical phase conjugator is flexibly configurable to employ an input-to-output carrier-frequency-mapping configuration that is most beneficial under particular operating conditions. mapping configuration that is most beneficial under particular operating conditions.

20 Claims, 4 Drawing Sheets

(56) References Cited

OTHER PUBLICATIONS

Jansen, S.L. et al., "Mixed Data Rate and Format Transmission (40-Gbit/s Non-Return-to-Zero, 40-Gbit/s Duobinary, and 10-Gbit/s Non-Return-to-Zero) by Mid-Link Spectral Inversion," Optics Letters, vol. 9, No. 2, Oct. 15, 2004, pp. 2348-2350.

Toulouse, J. et al., "Optical Nonlinearities in Fibers: Review, Recent Examples, and Systems Applications," Journal of Lightwave Technology, Nov. 2005, vol. 23, No. 11, pp. 3625-3641.

Doerr, Christopher R., "Coherent Receiver Having an Interleave-Chirped Arrayed Waveguide Grating," PCT International Application No. PCT/US10/44958, filed on Aug. 10, 2010.

\* cited by examiner

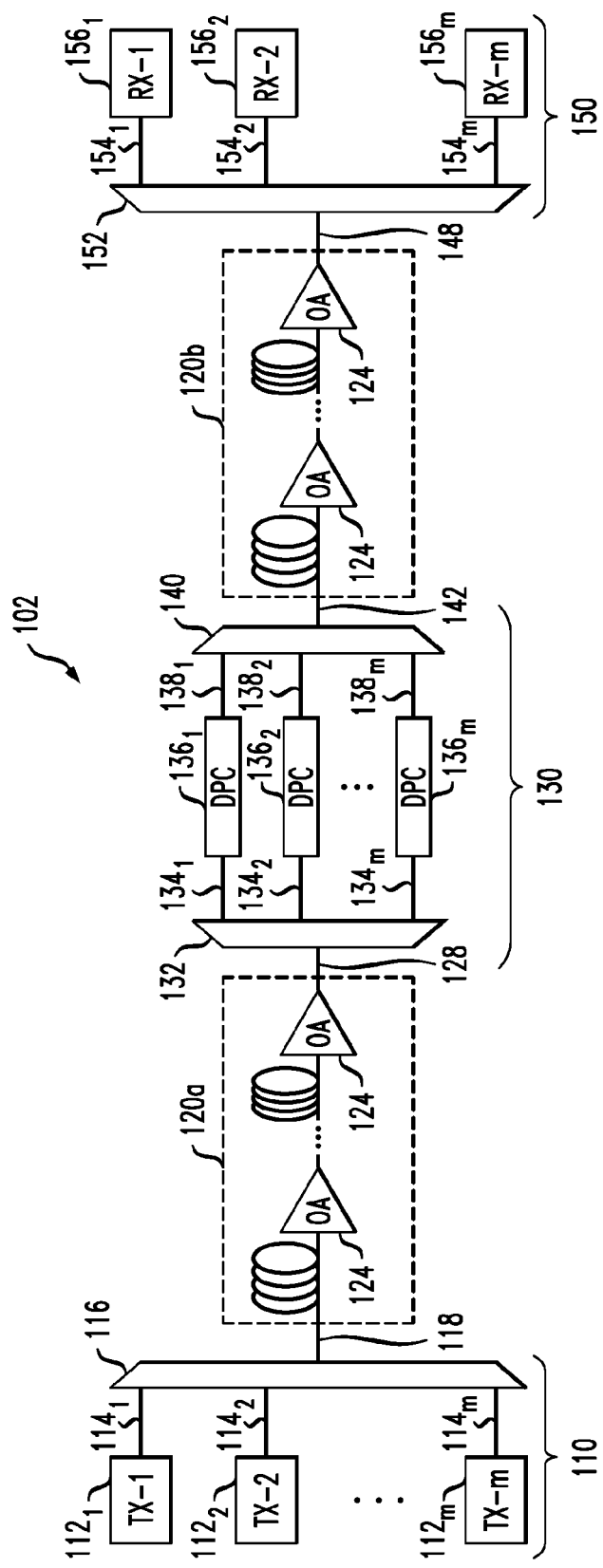

200

DIGITAL PHASE CONJUGATION FOR FIBER-OPTIC LINKS

BACKGROUND

1. Field of the Invention

The present invention relates to optical communication equipment and, more specifically but not exclusively, to optical signal-transmission techniques.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Optical fibers that are typically used in optical communication systems have a relatively low threshold for nonlinear optical effects. This characteristic of optical fibers becomes especially pronounced with wavelength-division-multiplexing (WDM) transmission formats, where many closely spaced wavelength channels populate the same optical fiber. As a result, the total light intensity in the fiber core becomes relatively high, which facilitates inter-channel nonlinear optical effects. As the modulation speed in each wavelength channel increases, the optical power needed for each channel tends to increase, which tends to promote intra-channel nonlinear optical effects in addition to the inter-channel effects.

One prior-art approach to dealing with adverse nonlinear effects in the optical fiber is to attempt to suppress all nonlinear effects by placing a relatively low limit on the optical power in the fiber. For example, a representative commercial 128-channel WDM system operating at a bit rate of 10 Gb/s per channel may limit the optical power to approximately −5 dBm/channel, for a total optical power of about 16 dBm. However, a relatively low channel power may result in a relatively low optical signal-to-noise ratio, which disadvantageously increases the bit-error rate (BER). The low optical signal-to-noise ratio may also limit the achievable spectral efficiency per channel and thus the total transmission capacity of the communication system. In addition, optical nonlinearities can be very useful for some applications, such as distributed in-fiber amplification, wavelength conversion, optical-pulse regeneration, dispersion compensation, and optical-signal monitoring. Hence, a more-balanced approach is needed that, on the one hand, enables mitigation of the adverse nonlinear effects and, on the other hand, takes advantage of the useful ones.

SUMMARY

Disclosed herein are various embodiments of an optical phase conjugator that can be deployed within a long-haul fiber-optic link of an optical WDM system to improve the system's tolerance to intra- and inter-channel nonlinear effects. In one embodiment, the optical phase conjugator has a digital signal processor configured to perform, in the digital electrical domain, a phase-conjugation transformation for various components of a WDM signal so that certain signal distortions imposed on that signal in the front portion of the fiber-optic link are reduced or removed in the back portion of the link. Advantageously, the optical phase conjugator is flexibly configurable to employ an input-to-output carrier-frequency-mapping configuration that is most beneficial under particular operating conditions.

According to one embodiment, provided is an apparatus comprising one or more phase-conjugation modules. Each of said phase-conjugation modules comprises a front-end circuit configured to convert a respective optical input signal into a first electrical in-phase (I) signal and a first electrical quadrature-phase (Q) signal; a signal-processing circuit configured to apply a phase-conjugation transformation to the first electrical I and Q signals to generate a first electrical I-drive signal and a first electrical Q-drive signal; and a back-end circuit configured to generate a respective optical output signal based on the first electrical I-drive and Q-drive signals.

According to another embodiment, provided is a method of processing an optical signal having the steps of: converting an optical input signal into a first electrical I signal and a first electrical Q signal; applying a phase-conjugation transformation to the first electrical I and Q signals to generate a first electrical I-drive signal and a first electrical Q-drive signal; and generating an optical output signal based on the first electrical I-drive and Q-drive signals.

BRIEF DESCRIPTION OF THE DRAWINGS

Other aspects, features, and benefits of various embodiments of the invention will become more fully apparent, by way of example, from the following detailed description and the accompanying drawings, in which:

FIG. 1 shows a block diagram of a WDM communication system according to one embodiment of the invention.

DETAILED DESCRIPTION

Figure 2A:
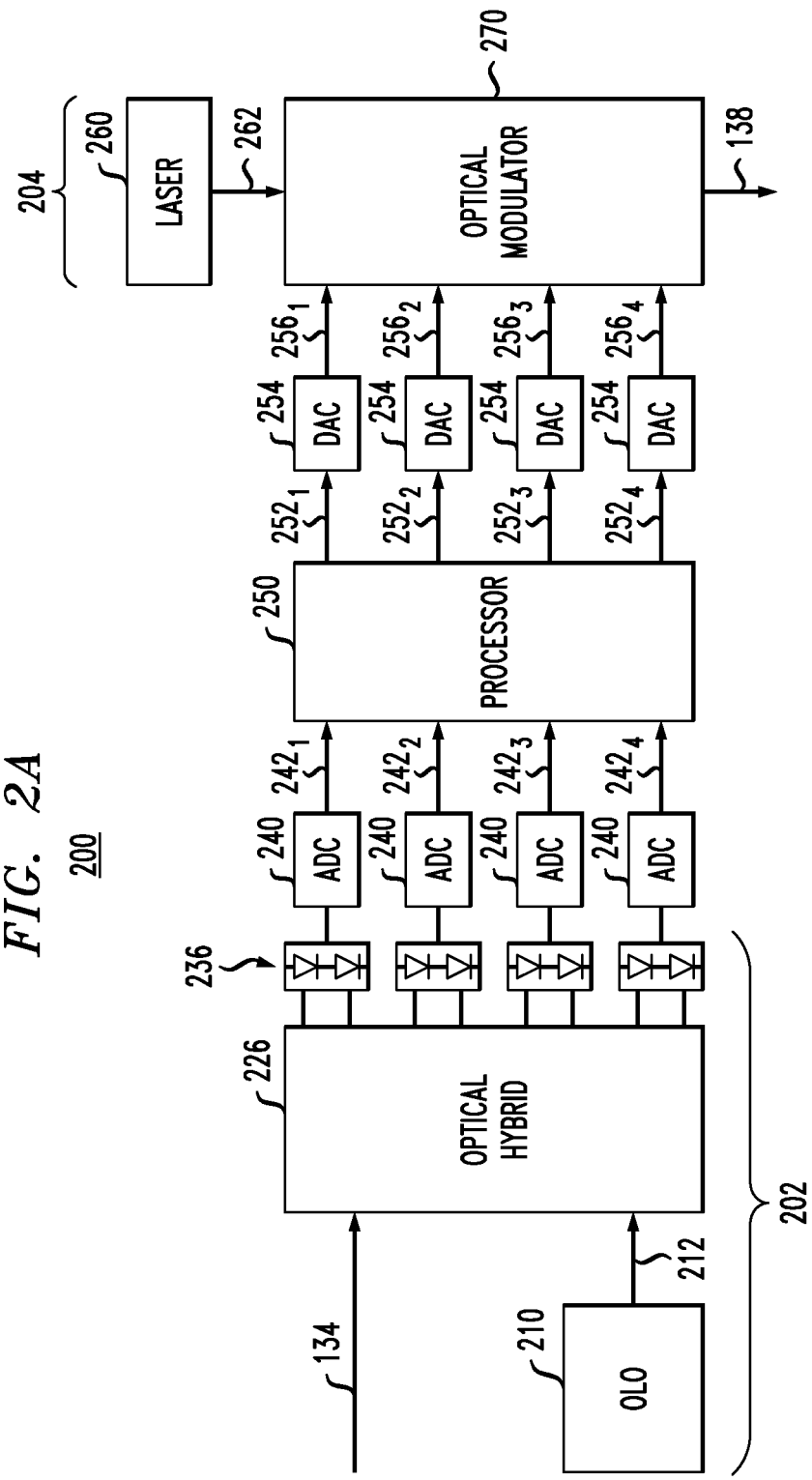
FIGS. 2A-2C show block diagrams of a digital phase conjugator that can be used in the WDM communication system of FIG. 1 according to one embodiment of the invention.

FIG. 1 shows a block diagram of a WDM communication system 100 according to one embodiment of the invention. System 100 is illustratively shown as having m>2 WDM channels. One skilled in the art will appreciate that, in alternative embodiments, system 100 may similarly be designed for m=1 or 2. In an embodiment having a single wavelength channel (m=1), certain optical elements shown in FIG. 1 might not be present. For example, optical multiplexers (MUXes) 116 and 140, optical de-multiplexers (DMUXes) 132 and 152, transmitter modules (Tx-i) $112_2$-$112_m$, and receiver modules (Rx-i) $156_2$-$156_m$ may be omitted.

System 100 has a WDM transmitter 110 and a WDM receiver 150 optically coupled to one another via a fiber-optic link 102. Link 102 has two amplified fiber-optic sections 120a-b, each having one or more optical amplifiers (OAs) 124 and one or more runs of fiber. Link 102 further has a multi-channel optical phase conjugator 130 coupled between fiber-optic sections 120a-b as shown in FIG. 1. In one embodiment, fiber-optic sections 120a-b have similar (e.g., differing by no more than 20%) lengths of fiber and/or the same numbers of optical amplifiers 124.

In an alternative embodiment (not explicitly shown in FIG. 1), link 102 may have three or more fiber-optic sections similar to fiber-optic sections 120a-b, wherein an instance of optical phase conjugator 130 is coupled between each two adjacent fiber-optic sections. For example, if link 102 has three fiber-optic sections 120, then the link has two optical phase conjugators 130. One of these two optical phase conjugators is coupled between the first and second fiber-optic sections of the link, and the other of these two optical phase conjugators is coupled between the second and third fiber-optic sections of the link. When link 102 has more than two fiber-optic sections 120, it may be of additional benefit to the performance characteristics of system 100 if these fiber-optic sections are designed so that all of them have approximately the same length (e.g., the shortest fiber-optic section in the link and the longest fiber-optic section in the link have a length difference of no more than 20%).

WDM transmitter 110 has transmitter modules $112_1$-$112_m$, each configured to produce a corresponding one of modulated optical signals $114_1$-$114_m$. In a representative configuration, each of optical signals $114_1$-$114_m$ has a corresponding different carrier wavelength (frequency), e.g., located on a wavelength (frequency) grid defined by the ITU-T G.694.1 (2002) Recommendation, which is incorporated herein by reference in its entirety. When expressed in frequency units, this grid extends from about 191.7 THz to about 196.1 THz, with a 100-, 50-, or 25-GHz spacing between adjacent frequencies. Optical multiplexer 116 combines signals $114_1$-$114_m$ to produce a WDM signal 118, which is then applied to fiber-optic section 120a of link 102 for transmission to optical phase conjugator 130. In one embodiment, each of signals $114_1$-$114_m$ is a polarization-division-multiplexed (PDM) signal. Various optical transmitters that can be used to implement WDM transmitter 110 and/or individual transmitter modules 112 are disclosed, e.g., in U.S. Patent Application Publication Nos. 2008/0138070 and 2007/0134001, both of which are incorporated herein by reference in their entirety.

Optical phase conjugator 130 receives an input WDM signal 128 from fiber-optic section 120a, processes this signal as further described below to generate an output WDM signal 142, and applies the latter signal to fiber-optic section 120b for transmission to WDM receiver 150. WDM signal 128 is produced after WDM signal 118 has traversed fiber-optic section 120a. Signal 128 is generally analogous to signal 118 but differs from the latter due to the presence of various signal distortions imposed by fiber-optic section 120a.

Optical de-multiplexer 132 splits WDM signal 128 into m corresponding WDM components $134_1$-$134_m$ and applies each of these components to a corresponding one of digital phase-conjugator (DPC) modules $136_1$-$136_m$. More details on possible implementations of a DPC module 136 are provided below in reference to FIG. 2. In one embodiment, each DPC module 136 performs the following operations: (1) carries out intradyne or heterodyne detection of the received WDM component 134 to generate a corresponding electrical in-phase (I) signal and a corresponding electrical quadrature-phase (Q) signal; (2) applies, in the digital electrical domain, a phase-conjugation transformation to the digital electrical versions of the I and Q signals to generate a corresponding I/Q pair of conjugated digital electrical signals; (3) converts the conjugated digital electrical signals into the corresponding analog electrical drive signals; and (4) uses these drive signals to drive an optical modulator, which is configured to produce a corresponding modulated optical signal 138. Optical multiplexer 140 multiplexes modulated optical signals $138_1$-$138_m$ generated by DPC modules $136_1$-$136_m$ respectively, to produce output WDM signal 142.

In one configuration, DPC modules $136_1$-$136_m$ operate in a synchronous manner. More specifically, each DPC module 136 is configured to operate so that the processing delay between its input signal 134 and its output signal 138 has a certain specified value that is the same for all DPC modules $136_1$-$136_m$. This characteristic ensures that the temporal alignment that exists between different optical "symbols" of signals $134_1$-$134_m$ is preserved and carried over to similarly temporally align the corresponding optical "symbols" of signals $138_1$-$138_m$.

In one embodiment, optical phase conjugator 130 generates signals $138_1$-$138_m$ so that their carrier frequencies are located on the same frequency grid as the carrier frequencies of WDM signal 128. Note that the carrier frequencies of signals $138_1$-$138_m$ define the carrier-frequency comb of WDM signal 142 just as the carrier frequencies of signals $114_1$-$114_m$ define the carrier-frequency comb of WDM signal 128. In various embodiments, the carrier-frequency combs of WDM signals 128 and 142 may be the same or different. For example, the carrier-frequency combs of WDM signals 128 and 142 may differ by (i) at least one carrier frequency and/or (ii) the frequency spacing between adjacent carrier frequencies. Therefore, in addition to the above-listed operations, some or all of DPC modules $136_1$-$136_m$ may also perform carrier-frequency conversion.

Table 1 shows three representative carrier-frequency configurations that can be used in optical phase conjugator 130. The configurations shown in Table 1 correspond to m=5 and assume the following relationship between different carrier frequencies $f_k$:

$$f_k = f_0 + k\Delta f \quad (1)$$

where $f_0$ is a constant, $\Delta f$ is the frequency spacing in the corresponding frequency grid, and k is an integer.

TABLE 1

Representative Carrier-Frequency Configurations for Optical Phase Conjugator 130

| DPC Module $136_i$ | Frequency in | Frequency out (Configuration 1) | Frequency out (Configuration 2) | Frequency out (Configuration 3) |
|---|---|---|---|---|
| i = 1 | $f_1$ | $f_1 + \Delta F$ | $f_5 + \Delta F$ | $f_7 + \Delta F$ |
| i = 2 | $f_2$ | $f_2 + \Delta F$ | $f_4 + \Delta F$ | $f_5 + \Delta F$ |
| i = 3 | $f_3$ | $f_3 + \Delta F$ | $f_3 + \Delta F$ | $f_3 + \Delta F$ |
| i = 4 | $f_4$ | $f_4 + \Delta F$ | $f_2 + \Delta F$ | $f_1 + \Delta F$ |
| i = 5 | $f_5$ | $f_5 + \Delta F$ | $f_1 + \Delta F$ | $f_{-1} + \Delta F$ |

The index i in the first column of Table 1 denotes the DPC channel number and is an independent parameter that is not directly related to the index k used in Eq. (1). The second column in Table 1 shows the input carrier frequencies received by different DPC modules $136_i$ in optical phase conjugator 130. The third, fourth, and fifth columns in Table 1 show the output carrier frequencies produced by DPC modules $136_1$-$136_5$ in three different configurations of optical phase conjugator 130. Note that the input carrier frequencies shown in the second column of Table 1 are applicable to each of these three different configurations.

In the first configuration of optical phase conjugator 130, which is indicated in Table 1 by the frequencies shown in the second and third columns, the output carrier frequency of each DPC channel is determined by applying a frequency offset ($\Delta F$) to the input carrier frequency of that channel, wherein the value of $\Delta F$ is the same for all channels. In general, $\Delta F$ can be any value, e.g., positive, negative, or zero. However, it may be preferred that the input and output carrier frequencies are located on the same general frequency grid. The latter type of signal mapping can be achieved, e.g., when $\Delta F$ is an integer multiple of $\Delta f$. When $\Delta F$=0, the carrier frequency of each DPC channel remains unchanged.

In the second configuration of optical phase conjugator 130, which is indicated in Table 1 by the frequencies shown in the second and fourth columns, the output carrier frequency of each DPC channel is determined by first inverting the order of frequencies in the carrier-frequency comb of signal 128 and then applying frequency offset $\Delta F$ to the resulting inverted carrier-frequency comb. When m is odd, the inversion changes all carrier frequencies, except the middle one. For example, for m=5, the inversion does not change the carrier frequency assigned to the third channel (i=3). As in the first configuration, $\Delta F$ can be any value, e.g., an integer multiple of Δf. If ΔF=0, then input WDM signal 128 and output WDM signal 142 have the same set of carrier frequencies despite the fact that some carrier frequencies are reassigned to other (i.e., differing from the initial) DPC channels.

In the third configuration of optical phase conjugator 130, which is indicated in Table 1 by the frequencies shown in the second and fifth columns, the output carrier frequency of each DPC channel is determined by first inverting the order of frequencies in the carrier-frequency comb of signal 128, then increasing the frequency spacing in the inverted comb by a factor of two, and applying frequency offset ΔF to the resulting spread-out carrier-frequency comb. The increase in the frequency spacing is performed so that the middle frequency of the frequency comb is fixed. Therefore, when m is odd, the carrier frequency of the middle (e.g., i=3 in Table 1) DPC channel is not affected by the spacing increase. As in the first and second configurations, ΔF can have any suitable value.

Depending on the chosen parameters, various configurations exemplified in Table 1 may have one or more of the following sets of characteristics:

(1) in one DPC channel of phase conjugator 130, the carrier frequency is unchanged from the input to the output, whereas in another DPC channel, the input and output carrier frequencies differ from one another and from said unchanged carrier frequency;

(2) the set of output carrier frequencies generated by phase conjugator 130 is the same as the set of input carrier frequencies received by it, while in at least one DPC channel of the of phase conjugator, the output carrier frequency is different from the input carrier frequency; and (3) the set of output carrier frequencies generated by phase conjugator 130 and the set of input carrier frequencies received by it have at least one common carrier frequency.

One skilled in the art will appreciate that other configurations of optical phase conjugator 130 may also be used in system 100 without departing from the scope and principles of the invention. For example, the input and output carrier frequencies of optical phase conjugator 130 might not be located on any predefined frequency grid. A cyclical frequency shift between different DPC channels may be applied instead of or in addition to the frequency-comb inversion. Other input-to-output frequency-mapping schemes are also contemplated. Since optical phase conjugator 130 is flexibly configurable in terms of input-to-output carrier-frequency mapping, it can advantageously be configured to employ a mapping configuration that is most beneficial for the particular characteristics of fiber-optic link 102.

WDM receiver 150 receives an input WDM signal 148 from fiber-optic section 120b, which signal is produced after WDM signal 142 has traversed that fiber-optic section. The phase conjugation imposed by optical phase conjugator 130 advantageously causes certain signal distortions in WDM signal 148 (measured with respect to WDM signal 118) to be smaller than the corresponding distortions in WDM signal 128 due to the known property of phase conjugation to effectively reverse the impact of the flow of time for certain evolving characteristics of the propagating signal. Therefore, when links 120a and 120b are very similar to each other (e.g., one is almost a copy of the other), the phase conjugation causes link 120b to effectively remove some of the signal distortions imposed by link 120a. As a result, WDM receiver 150 may be able to detect and decode WDM signal 148 with fewer errors than it would in the absence of optical phase conjugator 130.

Optical de-multiplexer 152 in WDM receiver 150 splits WDM signal 148 into m corresponding WDM components 154$_1$-154$_m$, and applies each of these components to a corresponding one of receiver modules 156$_1$-156$_m$. Each receiver module 156 detects and decodes the received WDM component 156 in a conventional manner to recover the data encoded onto the corresponding one of signals 114$_1$-114$_m$ at WDM transmitter 110. Various optical receivers that can be used to implement WDM receiver 150 and/or individual receiver modules 152 are disclosed, e.g., in U.S. Pat. No. 7,450,863 and U.S. Patent Application Publication No. 2010/0158521, both of which are incorporated herein by reference in their entirety.

Figure 2B:
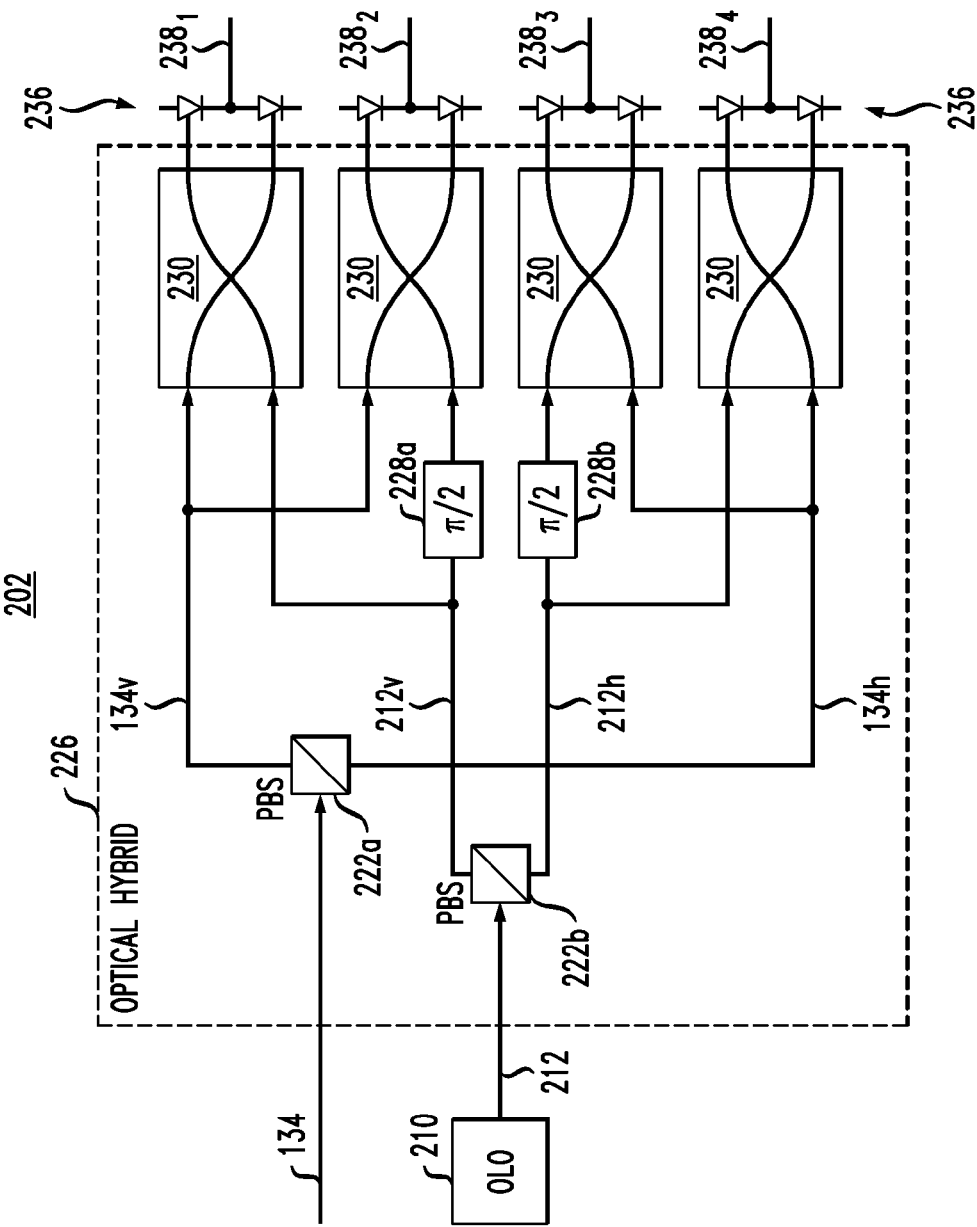
Figure 2C:
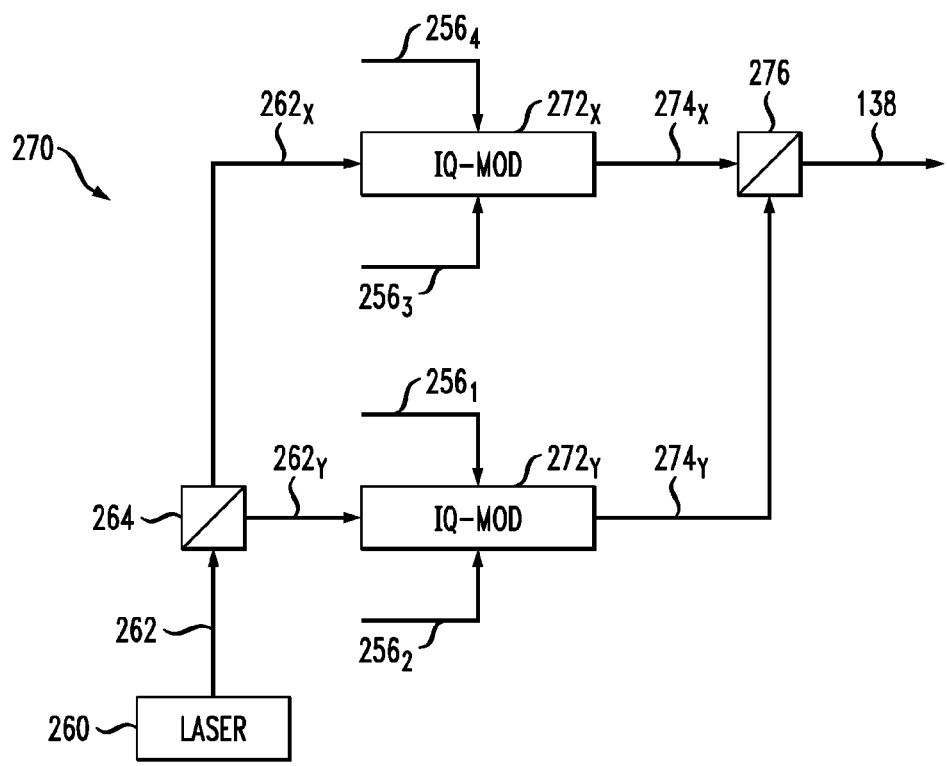

FIGS. 2A-2C show block diagrams of a digital phase conjugator 200 that can be used as any DPC module 136 (FIG. 1) according to one embodiment of the invention. More specifically, FIG. 2A shows an overall block diagram of digital phase conjugator 200. FIG. 2B shows a block diagram of a front end 202 in digital phase conjugator 200. Front end 202 receives optical signal 134 as its input signal (also see FIGS. 1 and 2A). FIG. 2C shows a block diagram of a back end 204 in digital phase conjugator 200. Back end 204 generates optical signal 138 as its output signal (also see FIGS. 1 and 2A). Digital phase conjugator 200 is designed for handling PDM input signals and generating PDM output signals.

Referring first to FIG. 2B, front end 202 in digital phase conjugator 200 implements polarization-diversity coherent detection of optical PDM signal 134. More specifically, front end 202 mixes signal 134 and an optical local-oscillator (OLO) signal 212 generated by an OLO source 210 to generate electrical output signals 238$_1$-238$_4$. Electrical output signals 238$_1$ and 238$_2$ are an I/Q signal pair corresponding to the vertical (or Y) polarization component of PDM signal 134. Similarly, electrical output signals 238$_3$ and 238$_4$ are an I/Q signal pair corresponding to the horizontal (or X) polarization component of PDM signal 134.

An optical hybrid 226 in front end 202 has two polarization beam splitters (PBSs) 222a-b that decompose signals 134 and 212, respectively, into two respective vertically polarized components 134v and 212v and two respective horizontally polarized components 134h and 212h. Each of polarization components 212v, 134v, 212h, and 134h is split into two (attenuated) copies, e.g., using conventional 3-dB power splitters (not explicitly shown). A relative phase shift of 90 degrees (π/2 radian) is then applied to one copy of component 212v and one copy of component 212h using phase shifters 228a-b, respectively. The various copies are then optically mixed as shown in FIG. 2B using four 2×2 signal mixers 230, and the mixed optical signals produced by the mixers are detected by eight photo-detectors (e.g., photodiodes) 236. Various optical mixers that are suitable for implementing optical hybrid 226 are commercially available, e.g., from Optoplex Corporation of Fremont, Calif., and CeLight, Inc., of Silver Spring, Md.

Photo-detectors 236 are arranged in balanced pairs, and the output of each photo-detector pair is a corresponding one of electrical signals 238$_1$-238$_4$. One skilled in the art will appreciate that electrical signal 238$_1$ is a measure of the real part (or the I component) of vertically polarized component 134v in the complex plane defined by OLO signal 212. Similarly, electrical signal 238$_2$ is a measure of the imaginary part (or the Q component) of vertically polarized component 134v in that complex plane; electrical signal 238$_4$ is a measure of the real part of horizontally polarized component 134h in that complex plane; and electrical signal 238$_3$ is a measure of the imaginary part of horizontally polarized component 134h in that complex plane. As shown in FIG. 2A, after analog-to-digital conversion in ADCs 240, electrical signals 238$_1$-238$_4$ become digital signals $242_1$-$242_4$, respectively, that are applied to a digital signal processor (DSP) 250.

Various optical-to-electrical (O/E) converters that can be used to implement front end 202 in other embodiments of digital phase conjugator 200 are disclosed, e.g., in U.S. Patent Application Publication No. 2010/0158521, U.S. patent application Ser. No. 12/541,548 (filed on Sep. 14, 2009), and International Patent Application No. PCT/US09/37746 (filed on Mar. 20, 2009), all of which are incorporated herein by reference in their entirety. Such O/E converters may use various single-ended detection schemes instead of or in addition to the balanced detection scheme that is shown in FIG. 2B.

Referring again to FIG. 2A, DSP 250 transforms digital signals $242_1$-$242_4$ into digital signals $252_1$-$252_4$ by applying to the former signals a phase-conjugation transformation defined by Eqs. (2):

$$I_X^{(c)} = Re[(I_X - jQ_X)e^{j\phi_1}] \quad (2a)$$

$$Q_X^{(c)} = Im[(I_X - jQ_X)e^{j\phi_1}] \quad (2b)$$

$$I_Y^{(c)} = Re[(I_Y - jQ_Y)e^{j\phi_2}] \quad (2c)$$

$$Q_Y^{(c)} = Im[(I_Y - jQ_Y)e^{j\phi_2}] \quad (2d)$$

where $I_X$ is a digital value provided by signal $242_4$; $Q_X$ is a digital value provided by signal $242_3$; $I_X^{(c)}$ is a digital value that is generated by DSP 250 for signal $252_4$; $Q_X^{(c)}$ is a digital value that is generated by the DSP for signal $252_3$; $I_Y$ is a digital value provided by signal $242_1$; $Q_Y$ is a digital value provided by signal $242_2$; $I_Y^{(c)}$ is a digital value that is generated by the DSP for signal $252_1$; $Q_Y^{(c)}$ is a digital value that is generated by the DSP for signal $252_2$; $\phi_1$ is a first phase-shift value; and $\phi_2$ is a second phase-shift value.

The phase-conjugation transformation defined by Eqs. (2) can be conceptualized as comprising the following steps. First, an I/Q pair of digital input signals is used to form a complex value, wherein the value provided by the I signal of the pair (e.g., signal $242_1$ or signal $242_4$) is the real part, and the value provided by the Q signal of the pair (e.g., signal $242_2$ or signal $242_3$) is the imaginary part. Second, a complex conjugate is derived from that complex value by changing the sign of its imaginary part. Third, the phase of the complex conjugate is changed by adding to it a corresponding phase-shift value (e.g., $\phi_1$ or $\phi_2$). Finally, the real and imaginary parts of the phase-shifted complex conjugate are used to form an I/Q pair of digital output signals (e.g., signals $252_1$/$252_2$ or signals $252_4$/$252_3$).

In one configuration, $\phi_1 = \phi_2 = 0$. For this configuration, Eqs. (2) can be reduced to Eqs. (3):

$$I_X^{(c)} = I_X \quad (3a)$$

$$Q_X^{(c)} = -Q_X \quad (3b)$$

$$I_Y^{(c)} = I_Y \quad (3c)$$

$$Q_Y^{(c)} = -Q_Y \quad (3d)$$

Note that both Eqs. (2) and Eqs. (3) assume that the I and Q signal components corresponding to the same polarization are substantially orthogonal to each other, which results from the phase shift introduced by each of phase shifters 228a-b being sufficiently close to 90 degrees. If this phase shift deviates from 90 degrees by a relatively large amount, then DSP 250 may be configured to perform non-orthogonality correction prior to applying the phase-conjugation transformation defined by Eqs. (2) or Eqs. (3).

Digital signals $252_1$-$252_4$ generated by DSP 250 as described above are applied to digital-to-analog converters (DACs) 254, where each of these signals is converted into an analog electrical form. The digital-to-analog conversion may also include signal amplification in an RF amplifier (not explicitly shown in FIG. 2A) and/or dc biasing in a voltage shifter (also not explicitly shown in FIG. 2A). The resulting analog signals $256_1$-$256_4$ are used to drive an optical modulator 270 in back end 204. It is clear from the above description that signals $256_1$ and $256_2$ are the in-phase (I) and quadrature-phase (Q) drive signals, respectively, corresponding to the Y (or vertical) polarization. Similarly, signals $256_4$ and $256_3$ are the in-phase (I) and quadrature-phase (Q) drive signals, respectively, corresponding to the X (or horizontal) polarization.

Referring now to FIG. 2C, optical modulator 270 comprises optical IQ-modulators $272_X$ and $272_Y$, each of which receives light from a laser source 260. More specifically, laser source 260 generates a light beam 262 having a desired carrier frequency, which determines the carrier frequency of output signal 138. As already indicated above, the carrier frequency of light beam 262 may differ from the carrier frequency of input signal 134 (also see FIG. 2A and Table 1).

A polarization beam splitter 264 splits light beam 262 into two sub-beams $262_X$ and $262_Y$ having the X and Y polarization, respectively. Sub-beam $262_X$ is applied to optical IQ-modulator $272_X$, and sub-beam $262_Y$ is applied to optical IQ-modulator $272_Y$. For sub-beams $262_X$ and $262_Y$ to have approximately equal intensities, laser source 260 is configured so that the polarization of light beam 262 is oriented at approximately 45 degrees with respect to the principal polarization axes of polarization beam splitter 264.

Optical IQ modulator $272_X$ modulates sub-beam $262_X$ while being driven by signals $256_4$ and $256_3$ to produce a modulated signal $274_X$. Optical IQ modulator $272_Y$ similarly modulates sub-beam $262_Y$ while being driven by signals $256_1$ and $256_2$ to produce a modulated signal $274_Y$. A polarization beam combiner 276 combines modulated signals $274_X$ and $274_Y$ to produce PDM output signal 138.

Compared to purely optical phase-conjugation schemes, e.g., those based on four-wave mixing, various embodiments of the present invention may provide one or more of the following benefits/advantages:
 (1) digital-electrical-domain implementation of the phase-conjugation transformation enables the optical portion of the phase conjugator to have a significantly lower complexity;
 (2) flexibility in input-to-output carrier-frequency mapping for WDM signals can readily be used to employ carrier-frequency configurations (see, e.g., Table 1) that are effective in mitigating undesirable nonlinear effects, such as cross-phase modulation; and
 (3) digital phase-conjugation can readily be combined with other useful digital-signal-processing techniques, such as (i) time-matching of the sampled waveforms corresponding to different polarizations, (ii) correction of possible non-orthogonality between the I and Q signal components; (iii) mitigation of signal distortions caused by bandwidth limitations of the transmitter and/or receiver; and (iv) compensating for the possible frequency offset between the carrier frequency of the optical input signal and that of the OLO signal.

Compared to certain prior-art digital, electrical, nonlinearity-compensation schemes, various embodiments of the present invention may provide one or more of the following benefits/advantages:
 (1) a need for dispersion compensation is alleviated, thereby enabling the use of less-complex DSPs;

(2) better tolerance to intra-channel nonlinear effects, such as self-phase modulation; and (3) better mitigation of inter-channel nonlinear effects, such as cross-phase modulation, through the flexibility in input-to-output carrier-frequency mapping for WDM signals.

Various additional embodiments of the invention may include, but are not limited to application to (i) optical multi-carrier signals, e.g. orthogonal frequency-division-multiplexed (OFDM) signals, where different carriers or sub-channels can be phase-conjugated and re-arranged in frequency, and (ii) the use of multiple optical phase conjugators 130 at more than one location along the transmission link. In certain embodiments, the DPC operation defined by Eqs. (2) can be achieved by swapping the I and Q signals in optical mixers 230 or in optical IQ modulators $272_X$ and $272_Y$. In addition, changing the polarity of the Q waveform (e.g., signal $238_2$) while leaving unchanged the polarity of the I waveform (e.g., signal $238_1$) can also be used to implement the phase-conjugation transformation.

While this invention has been described with reference to illustrative embodiments, this description is not intended to be construed in a limiting sense. For example, a plurality of DPC modules 136 (FIG. 1) may share a single, relatively powerful DSP to carry out the functions of all their respective processors, such as processor 250 (FIG. 2A). Although digital phase conjugator 200 has been described above in reference to PDM signals, certain embodiments can operate with optical signals that are not polarization-division multiplexed. Various modifications of the described embodiments, as well as other embodiments of the invention, which are apparent to persons skilled in the art to which the invention pertains are deemed to lie within the principle and scope of the invention as expressed in the following claims.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

Unless explicitly stated otherwise, each numerical value and range should be interpreted as being approximate as if the word "about" or "approximately" preceded the value of the value or range.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising one or more phase-conjugation modules, wherein each of said phase-conjugation modules comprises:
    a front-end circuit configured to convert a respective optical input signal into a first electrical in-phase (I) signal and a first electrical quadrature-phase (Q) signal;
    a signal-processing circuit configured to apply a phase-conjugation transformation to the first electrical I and Q signals to generate a first electrical I-drive signal and a first electrical Q-drive signal; and
    a back-end circuit configured to generate a respective optical output signal based on the first electrical I-drive and Q-drive signals.

2. The apparatus of claim 1, wherein the signal-processing circuit comprises a digital signal processor (DSP) that performs the phase-conjugation transformation in a digital domain.

3. The apparatus of claim 2, wherein the DSP is configured to generate a complex-conjugate value having a real part that is based on the first electrical I signal and an imaginary part that is based on the first electrical Q signal, wherein the first electrical I-drive and Q-drive signals are generated based on the complex-conjugate value.

4. The apparatus of claim 3, wherein the DSP is further configured to generate a phase-shifted complex-conjugate value by changing a phase of the complex-conjugate value, wherein the first electrical I-drive and Q-drive signals are generated based on the phase-shifted complex-conjugate value.

5. The apparatus of claim 2, wherein the signal-processing circuit further comprises:
an analog-to-digital-converter (ADC) circuit configured to convert (i) the first electrical I signal into a corresponding first digital signal and (ii) the first electrical Q signal into a corresponding second digital signal, wherein the DSP applies the phase-conjugation transformation to the first and second digital signals to generate a third digital signal and a fourth digital signal; and
a digital-to-analog-converter (DAC) circuit configured to convert the third digital signal into the electrical I-drive signal and the fourth digital signal into the electrical Q-drive signal.

6. The apparatus of claim 1, wherein:
the optical input signal has a first carrier frequency; and
the optical output signal has the first carrier frequency.

7. The apparatus of claim 1, wherein the one or more phase-conjugation modules comprise:
a first phase-conjugation module; and
a second phase-conjugation module, wherein:
the optical input signal of the first phase-conjugation module has a first carrier frequency;
the optical output signal of the first phase-conjugation module has a second carrier frequency that is different from the first carrier frequency;
the optical input signal of the second phase-conjugation module has a third carrier frequency; and
the optical output signal of the second phase-conjugation module has the third carrier frequency.

8. The apparatus of claim 1, wherein the one or more phase-conjugation modules comprise a plurality of phase-conjugation modules, wherein:
carrier frequencies of the optical input signals of said plurality of phase-conjugation modules form a first carrier-frequency set having at least two carrier frequencies; and
carrier frequencies of the optical output signals of said plurality of phase-conjugation modules form a second carrier-frequency set having at least two carrier frequencies.

9. The apparatus of claim 8, wherein:
the first carrier-frequency set is the same as the second carrier-frequency set; and
for at least one phase-conjugation module of the plurality, the carrier frequency of the corresponding optical output signal is different from the carrier frequency of the corresponding optical input signal.

10. The apparatus of claim 8, wherein the first carrier-frequency set and the second carrier-frequency set have at least one common carrier frequency.

11. The apparatus of claim 8, wherein:
the first carrier-frequency set has a first frequency spacing between adjacent carrier frequencies; and
the second carrier-frequency set has a second frequency spacing between adjacent carrier frequencies that is different from the first frequency spacing.

12. The apparatus of claim 1, wherein:
the optical input signal is a polarization-division-multiplexed signal; and
the first electrical I and Q signals correspond to a first polarization of the optical input signal.

13. The apparatus of claim 12, wherein:
the front-end circuit is further configured to convert the respective optical input signal into a second electrical I signal and a second electrical Q signal, wherein the second electrical I and Q signals correspond to a second polarization of the optical input signal that is different from the first polarization;
the signal-processing circuit is further configured to apply a phase-conjugation transformation to the second electrical I and Q signals to generate a second electrical I-drive signal and a second electrical Q-drive signal; and
the back-end circuit is further configured to generate the respective optical output signal based on the second electrical I-drive and Q-drive signals, wherein:
the optical output signal is a polarization-division-multiplexed signal having a first polarization component and a second polarization component;
the first polarization component is generated based on the first electrical I-drive and Q-drive signals; and
the second polarization component is generated based on the second electrical I-drive and Q-drive signals.

14. The apparatus of claim 1, wherein the front-end circuit comprises:
an optical local-oscillator (OLO) source configured to generate an OLO signal;
an optical mixer configured to mix the OLO signal and the optical input signal to generate a plurality of optical mixed signals; and
a plurality of photo-detectors configured to convert the plurality of optical mixed signals into the first electrical I and Q signals.

15. The apparatus of claim 1, wherein:
the one or more phase-conjugation modules comprise a plurality of phase-conjugation modules;
the apparatus further comprises:
an optical de-multiplexer coupled to the front-end circuits of the plurality of phase-conjugation modules; and
an optical multiplexer coupled to the back-end circuits of the plurality of phase-conjugation modules.

16. The apparatus of claim 15, further comprising:
an optical transmitter;
an optical receiver;
a first fiber-optic section coupled between the optical transmitter and the optical de-multiplexer; and
a second fiber-optic section coupled between the optical multiplexer and the optical receiver, wherein:
the optical transmitter is configured to transmit a first WDM signal, via the first fiber-optic section, to the optical de-multiplexer;
the optical de-multiplexer is configured to split the first WDM signal into a plurality of WDM components, wherein each of said WDM components provides the respective optical input signal to the respective phase-conjugation module;
the optical multiplexer is configured to multiplex the optical output signals generated by the plurality of phase-conjugation modules to generate a second WDM signal; and
the optical receiver is configured to receive the second WDM signal, via the second fiber-optic section, from the optical multiplexer.

17. The apparatus of claim 16, wherein the first and second fiber-optic sections have lengths that differ from each other by no more than about 20%.

18. The apparatus of claim 1, wherein:
the one or more phase-conjugation modules comprise a plurality of phase-conjugation modules; and
the apparatus comprises a digital signal processor, wherein the signal-processing circuits of the plurality are configured to share the digital signal processor to carry out the phase-conjugation transformations.

19. The apparatus of claim 18, wherein the digital signal processor is further configured to implement one or more of the following:
- time-match digital samples of waveforms corresponding to different polarizations;
- correct non-orthogonality between the corresponding I and Q signals;
- mitigate signal distortions caused by bandwidth limitations of (i) a transmitter that transmitted the optical input signals and/or (ii) a receiver configured to receive the optical output signals; and
- compensate for a frequency offset between a carrier frequency of the optical input signal and a local-oscillator signal.

20. A method of processing an optical signal, the method comprising:
- converting an optical input signal into a first electrical in-phase (I) signal and a first electrical quadrature-phase (Q) signal;
- applying a phase-conjugation transformation to the first electrical I and Q signals to generate a first electrical I-drive signal and a first electrical Q-drive signal; and
- generating an optical output signal based on the first electrical I-drive and Q-drive signals.

* * * * *